United States Patent
Luedtke et al.

(10) Patent No.: US 9,927,776 B2
(45) Date of Patent: Mar. 27, 2018

(54) INTENTIONALLY INCREASING A NON-TORQUE OUTPUT OF AN ELECTRIC MACHINE IN AN ELECTRIC VEHICLE

(71) Applicant: Ford Global Technologies, LLC, Dearborn, MI (US)

(72) Inventors: Daniel Richard Luedtke, Beverly Hills, MI (US); Johnathan Andrew Butcher, Farmington, MI (US); Kent Hancock, Ann Arbor, MI (US); Fazal Urrahman Syed, Canton, MI (US); Paul Stephen Bryan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 776 days.

(21) Appl. No.: 14/288,754

(22) Filed: May 28, 2014

(65) Prior Publication Data

US 2015/0346696 A1  Dec. 3, 2015

(51) Int. Cl.
| | |
|---|---|
| *H02P 3/00* | (2006.01) |
| *H02P 1/00* | (2006.01) |
| *G05B 6/02* | (2006.01) |
| *H02P 3/14* | (2006.01) |
| *H02P 29/62* | (2016.01) |
| *B60L 3/00* | (2006.01) |

(52) U.S. Cl.
CPC .............. *G05B 6/02* (2013.01); *B60L 3/00* (2013.01); *H02P 3/14* (2013.01); *H02P 29/62* (2016.02)

(58) Field of Classification Search
CPC .......... H02P 29/005; H02P 29/62; H02P 3/14; G05B 6/02; B60L 3/00
USPC ................................................ 318/376, 452
See application file for complete search history.

(56) References Cited

U.S. PATENT DOCUMENTS

| | | | |
|---|---|---|---|
| 6,283,240 B1 * | 9/2001 | Beever ................... | B60K 6/485 180/178 |
| 8,114,547 B1 | 2/2012 | Brighton, II et al. | |
| 2003/0140636 A1 * | 7/2003 | Van Winkle .............. | F01P 9/06 62/3.61 |
| 2005/0209747 A1 * | 9/2005 | Yakes ...................... | B60K 6/46 701/22 |
| 2010/0218916 A1 | 9/2010 | Miller et al. | |
| 2012/0072065 A1 * | 3/2012 | Minamikawa ......... | B60K 6/445 701/22 |
| 2013/0046425 A1 * | 2/2013 | Sime ..................... | B60W 20/00 701/22 |
| 2014/0024492 A1 | 1/2014 | Dextreit | |

* cited by examiner

*Primary Examiner* — Bentsu Ro
*Assistant Examiner* — Gabriel Agared
(74) *Attorney, Agent, or Firm* — Carlson, Gakey & Olds, P.C.

(57) ABSTRACT

An example method includes operating an electric machine to produce a torque output and a non-torque output. The method maintains the torque output and intentionally increases the non-torque output to produce a desired condition in an electric vehicle.

20 Claims, 2 Drawing Sheets

INTENTIONALLY INCREASING A NON-TORQUE OUTPUT OF AN ELECTRIC MACHINE IN AN ELECTRIC VEHICLE

BACKGROUND

This disclosure relates generally to operating an electric machine of an electric vehicle. More particularly, this disclosure relates to intentionally increasing the non-torque output from the electric machine to bring about desired conditions.

Example electric vehicles include hybrid electric vehicles (HEVs), and plug-in hybrid electric vehicles (PHEVs). Generally, hybrid vehicles differ from conventional vehicles because hybrid vehicles are selectively driven using a battery-powered electric machine. Conventional vehicles, by contrast, rely exclusively on an internal combustion engine to drive the vehicle.

The electric machines receive electrical power and produce mechanical power to drive the vehicle. The electric machines can produce torque output and non-torque output. Generally, the electric machines of electric vehicles operate in a way that maximizes torque output.

SUMMARY

A method according to an exemplary aspect of the present disclosure includes, among other things, operating an electric machine to produce a torque output and a non-torque output, and maintaining the torque output and intentionally increasing the non-torque output to produce a desired condition in an electric vehicle.

In a further non-limiting embodiment of the foregoing method, the desired condition is a run-on during a deceleration of the electric vehicle.

In a further non-limiting embodiment of any of the foregoing methods, the desired condition is a deceleration of the electric vehicle during a descent.

In a further non-limiting embodiment of any of the foregoing methods, the electric vehicle is decelerated without using a friction brake.

In a further non-limiting embodiment of any of the foregoing methods, the desired condition is an increasing of thermal energy in a fluid of the electric vehicle.

In a further non-limiting embodiment of any of the foregoing methods, the fluid comprises a transmission fluid.

In a further non-limiting embodiment of any of the foregoing methods, intentionally increasing the non-torque output reduces a ratio of torque output to a total electrical input power by at least ten percent.

In a further non-limiting embodiment of any of the foregoing methods, the method includes driving a vehicle wheel using the electric machine.

In a further non-limiting embodiment of any of the foregoing methods, the method includes calculating the amount of potential non-torque output available within an electric drive system.

In a further non-limiting embodiment of any of the foregoing methods, the method includes calculating the amount of usable non-torque output available within an electric drive system based on device temperatures.

An electric vehicle assembly according to another exemplary aspect of the present disclosure includes, among other things, an electric machine to drive an electric vehicle, a controller that maintains a torque output from the electric machine and intentionally increases a non-torque output from the electric machine to produce a desired condition in an electric vehicle.

In a further non-limiting embodiment of the foregoing assembly, the desired condition is a run-on during a deceleration of the electric vehicle.

In a further non-limiting embodiment of any of the foregoing assemblies, the desired condition is a deceleration of the electric vehicle during a descent without using a friction brake separate from the electric machine.

In a further non-limiting embodiment of any of the foregoing assemblies, the desired condition is an increasing of thermal energy in a fluid of the electric vehicle.

In a further non-limiting embodiment of any of the foregoing assemblies, the fluid comprises a transmission fluid.

In a further non-limiting embodiment of any of the foregoing assemblies, intentionally increasing the non-torque output reduces a ratio of the torque output to a total electrical input power by at least ten percent.

In a further non-limiting embodiment of any of the foregoing assemblies, the assembly includes driving a vehicle wheel using the electric machine.

In a further non-limiting embodiment of any of the foregoing assemblies, the controller is an electric drive system controller that calculates the non-torque output based at least in part on device temperature.

In a further non-limiting embodiment of any of the foregoing assemblies, a vehicle system controller that calculates whether the non-torque output is desired.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
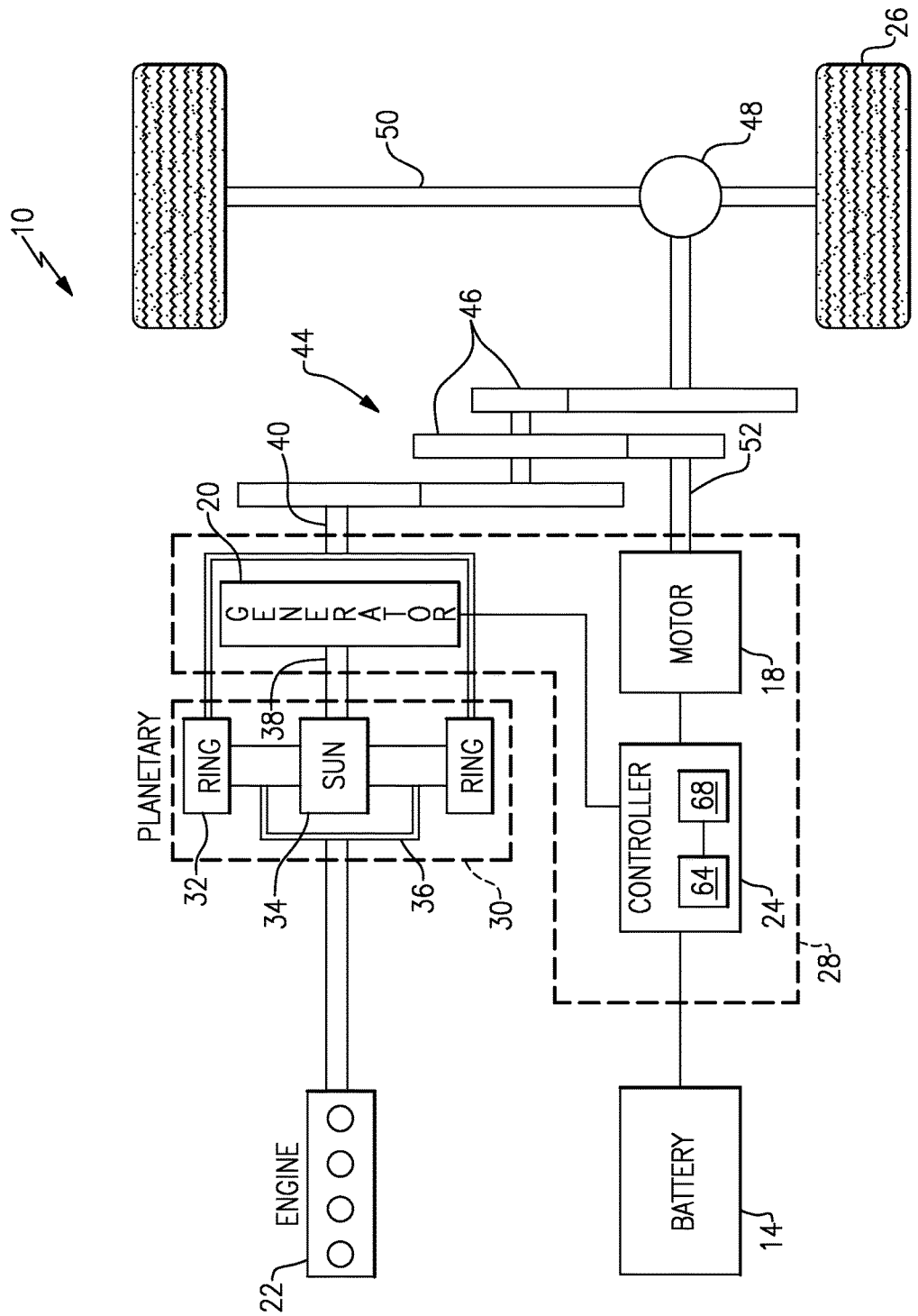
FIG. 1 illustrates a schematic view of an example transmission for an electric vehicle.

FIG. 1 schematically illustrates a powertrain 10 for an electric vehicle. The powertrain 10 includes a battery 14, a motor 18, a generator 20, and an internal combustion engine 22.

The motor 18 and generator 20 are types of electric machines. The motor 18 and generator 20 may be separate or may have the form of a combined motor/generator.

Given an electrical input (from the battery 14), the motor 18 and generator 20 produce torque and non-torque outputs. Electric machines are typically operated in a way that minimizes non-torque outputs. In the disclosed examples, the non-torque outputs are selectively increased to bring about desired conditions in the powertrain 10 and remaining portions of the electric vehicle.

Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a power-split powertrain system that employs a first drive system and a second drive system. The first drive system includes a combination of the engine 22 and the generator 20. The second drive system includes at least the motor 18, the generator 20, and a battery 14. The first and second drive systems generate torque to drive one or more sets of vehicle drive wheels 26 of the electric vehicle. The motor 18 and the generator 20, together with a controller 24, are considered an electric drive system 28 of the powertrain 10.

The engine 22, which is an internal combustion engine in this example, and the generator 20 may be connected through a power transfer unit 30, such as a planetary gear set. Of course, other types of power transfer units, including other gear sets and transmissions, may be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 may be connected to a shaft 40, which is connected to vehicle drive wheels 26 through a second power transfer unit 44. The second power transfer unit 44 may include a gear set having a plurality of gears 46. Other power transfer units may also be suitable. The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery 14.

The battery 14 is an example type of electric vehicle battery assembly. The battery 14 may be a relatively high-voltage battery that is capable of outputting electrical power to operate the motor 18 and the generator 20. Other types of energy storage devices and/or output devices can also be used with the powertrain 10.

The powertrain controller 24 is operatively coupled to the internal combustion engine 22, the electric drive system 28 and the battery 14. In some examples, the controller 24 is an inverter system controller combined with a variable voltage converter (ISC/VVC). In other examples, the controller 24 is part of an engine control module, a battery electric control, etc. within the vehicle. The controller 24 is configured to control specific components within the electric drive system 28, such as the generator 20, the motor 36, or both to support bidirectional power flow.

The example controller 24 includes a processor 64 operatively linked to a memory portion 68. The example processor 64 is programmed to execute a program stored in the memory portion 68. The program may be stored in the memory portion 68 as software code.

The program stored in the memory portion 68 may include one or more additional or separate programs, each of which includes an ordered listing of executable instructions for implementing logical functions.

The processor 64 can be a custom made or commercially available processor, a central processing unit (CPU), an auxiliary processor among several processors associated with the controller 24, a semiconductor based microprocessor (in the form of a microchip or chip set) or generally any device for executing software instructions.

The memory portion 68 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

Figure 2:
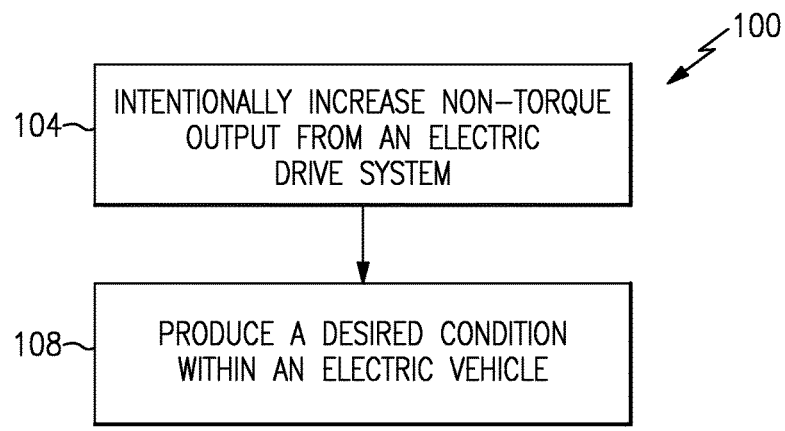
FIG. 2 shows the flow of an example method of operating the electric vehicle.

Referring now to FIG. 2 with continued reference to FIG. 1, the example controller 24 is configured to execute a program that performs steps of a method 100. In the method 100, the motor 18 and generator 20 of the electric drive system 28 produce torque and non-torque outputs for a given input.

During typical operation, the electric drive system 28 is calibrated to minimize the non-torque output. For example, if 50 newton meters of torque output are required from the electric drive system 28, the controller 24 causes the electric machine to produce 50 newton meters of torque with minimal non-torque output.

At a step 104, the method 100 intentionally causes the electric drive system 28 to increase the non-torque output. The torque output is maintained during the step 104.

The method 100 produces a desired condition within the electric vehicle at a step 108 using at least some of the non-torque output. Since additional non-torque output is used to bring about the desired condition, the torque efficiency of the electric drive system 28 is reduced as a result of the step 108.

A ratio of torque output to a total electrical input power is generally considered the torque efficiency for a given electrical machine. The electric drive system 28 typically minimizes non-torque outputs to operate at or near a peak torque efficiency. At the peak torque efficiency, a nominal maximum amount of torque output is generated for a given electrical input.

The electric drive system 28 can be exposed to various environmental conditions over a drive cycle. The environmental conditions can influence how efficiently the electric machine operates. Thus, the peak torque efficiency for the electric drive system 28 can vary based on environmental conditions.

In the step 104, the controller 24 controls the electric drive system 28 to produce required output torque but while operating at less than peak efficiency or nominal peak efficiency. For example, the controller 24 can cause the electric drive system 28 to produce the previously mentioned 50 newton meters of torque output while also producing increased non-torque output, such as heat.

In one example of the step 104, the controller 24 sends more field weakening current to the electric drive system 28 than is necessary to produce a desired torque output. This causes the electric drive system 28 to produce more non-torque output and generate thermal energy. This example of the step 104 can be more effective for generating the thermal energy when the electric drive system 28 is operating at low to medium speeds than when the electric drive system 28 is operating at higher speeds.

In another example of the step 104, the controller 24 sends a positive input current to the electric drive system 28 rather than a negative input current. This increases the non-torque output from the electric drive system 28 and generates thermal energy. This example of the step 104 can be more effective when the electric machine is operating at low to medium speeds than when the electric drive system 28 is operating at higher speeds.

In another example of the step 104, the controller 24 injects the input current for the electric drive system 28 into a negative frequency. This increases the non-torque output from the electric drive system 28 and generates thermal energy. This example of the step 104 may cause the rotor of the electric drive system 28 to heat more quickly than the stator. This example of the step 104 can have relatively minimal impact to normal control operations of the vehicle driven by the powertrain 10.

In the above examples of the step 104, the controller 24 causes the increases in non-torque output from the motor 18, the generator 20, or both. In other examples, the controller 24 may cause increases in non-torque output using other components of the electric drive system 28, such as an inverter of the electric drive system.

In one such example of the step 104, the controller 24 adjusts pulse width modulated frequencies of the input current for the motor 18, the generator 20, the variable voltage converter, or some combination of these.

In another such example of the step 104, the controller 24 causes relatively inefficient pulse width modulated modes for the input current of the motor 18, the generator 20, the variable voltage converter, or some combination of these.

In yet another such example of the step 104, the controller 24 causes the variable voltage controller to boost prematurely. Operating the variable voltage controller to boost the bus voltage incurs additional non-torque output and can be desirable when the increased variable voltage controller non-torque output is offset by decreased motor/generator non-torque output, or when the higher voltage is necessary to meet the motor/generator torque commands.

The increase in non-torque output can be used to produce various types of desired conditions in the step 108. In one example, the desired condition is a run-on during a deceleration of a vehicle driven by the powertrain 10. This example desired condition would cause an occupant of the vehicle to sense a "run-on" feel during a power surge of the engine 22.

A power surge of the engine 22 can be caused when the accelerator tips out and the engine torque does not drop fast enough. During such a surge, occupants of the vehicle may sense the run-on feel, which essentially is a feeling that the vehicle is not slowing down as expected. If, during the surge, the electric drive system is operated at less than peak efficiency, the run-on feel may be reduced. Dumping excess power from the engine power surge into the electric drive system 28 while the electric drive system 28 is operating inefficiently enables the electric drive system 28 to absorb this power surge and reduce the run-on feel. This strategy is especially useful when the battery is at a high state of charge (SOC) and cannot accept much energy and therefore the surge energy must be dumped as thermal energy.

In one example, the desired condition is absorbing power generated during a sustained downhill drive of the vehicle. Sustained downhill driving charges the battery 14 of the powertrain 10. If the downhill driving continues, the battery 14 will eventually fully charge. Thus, the battery 14 can no longer take on power generated during downhill driving. In such situations, the engine 22 is typically cranked to take on the excess power that cannot be stored within the battery 14. Operating the engine 22 produces a relatively loud audible noise.

When the electric drive system 28 operates produces increased non-torque output, the input to the electric drive system 28 can be increased without changing the torque output. The electric drive system 28 can thus take on more power when after increasing the non-torque output. Thus, during sustained downhill driving, the battery 14 does not charge as fast when after increasing the non-torque output. This extends the time before the battery 14 is fully charged and the time before excess power must be dumped to the engine 22. In some examples, the battery 14 would be allowed to charge fully, after which point the non-torque output would be increased to extend time before excess power must be dumped to the engine 22.

In some examples, the vehicle decelerates during the decent due to the electric drive system 28 and without using a friction brake For some hybrid configurations with relatively downsized engines 22, the engine 22 alone may not be able to provide sufficient braking torque. In such examples, inefficiently operating the electric drive system 28 can facilitate braking the vehicle.

In yet another example of the step 108, the desired condition can be operating the electric drive system 28 inefficiently to generate additional thermal energy. This additional thermal energy is routed to areas of the powertrain 10 proximate to hydraulic fluid storage locations, for example. The additional thermal energy heats the transmission fluid, which can improve fuel economy within the powertrain 10.

Figure 3:
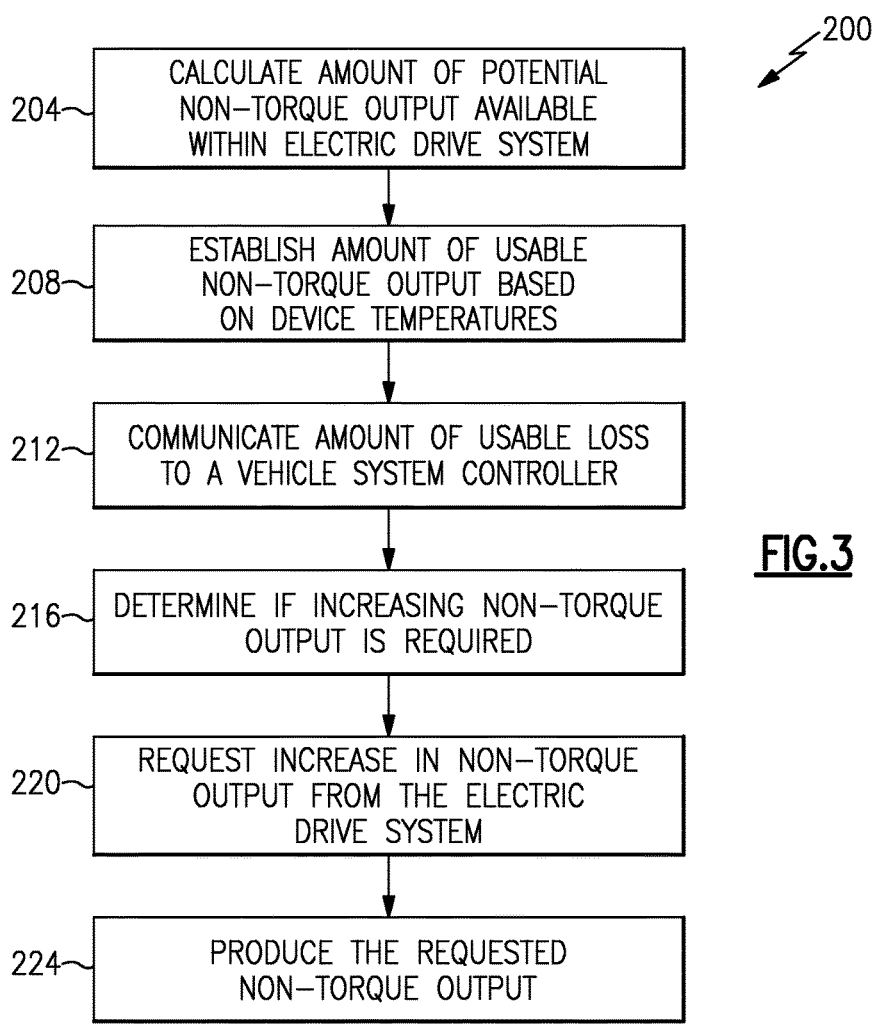
FIG. 3 shows the flow of another example method of operating the electric vehicle.

Referring now to FIG. 3 with continuing reference to FIG. 1, in another example method 200 the controller 24 calculates the amount of potential non-torque output available within the electric drive system 28 at a step 204. The method 200 then establishes an amount of usable non-torque output based on device temperatures at a step 208. For example, an amount of potential non-torque output within the electric drive system 28 may be 20 kilowatts, but this would cause the motor 18 to exceed a maximum acceptable operating temperature. The method 200 accounts for this at the step 208 and calculates an amount of usable non-torque output to be 15 kilowatts.

At a step 212, a vehicle system controller receives the amount of usable non-torque output. The controller 24 is an electric drive system controller in this example, and the vehicle system controller is a separate controller outside the electric drive system 28. In another example, the vehicle system controller is part of the controller 24.

The vehicle system controller, at a step 216, determines if any increase in non-torque output is required. As described previously, non-torque output may be required when the vehicle and powertrain 10 are on a sustained downhill drive, require fluid heating, etc.

At a step 220, the vehicle system controller requests non-torque output from the electric drive system 28. The level of requested non-torque output is at or below the amount of usable non-torque output. The electric drive system 28 then produces the requested non-torque output at a step 224.

Features of the examples of this disclosure include an electric drive system having non-torque output that is increased to bring about desired conditions within the electric vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method, comprising:
   operating an electric machine to produce a torque output and a non-torque output; and
   using a powertrain controller to adjust the operating by maintaining the torque output while intentionally increasing the non-torque output to reduce a torque efficiency of the electric machine and produce a condition in an electric vehicle.

2. The method of claim 1, wherein the condition is a run-on during a deceleration of the electric vehicle.

3. The method of claim 1, wherein the condition is a deceleration of the electric vehicle during a descent.

4. The method of claim 3, wherein the electric vehicle is decelerated without using a friction brake.

5. The method of claim 1, wherein the condition is an increasing of thermal energy in a fluid of the electric vehicle.

6. The method of claim 1, wherein intentionally increasing the non-torque output reduces a ratio of torque output to a total electrical input power by at least ten percent.

7. The method of claim 1, further comprising driving a vehicle wheel using the electric machine.

8. The method of claim 1, further comprising calculating the amount of potential non-torque output available within an electric drive system.

9. The method of claim 8, further comprising calculating the amount of usable non-torque output available within the electric drive system based on device temperatures.

10. An electric vehicle assembly, comprising:
    an electric machine to drive an electric vehicle; and
    a controller that maintains a torque output from the electric machine and intentionally increases a non-torque output from the electric machine to reduce a torque efficiency of the electric machine and produce a condition in an electric vehicle.

11. The assembly of claim 10, wherein the condition is a run-on during a deceleration of the electric vehicle.

12. The assembly of claim 10, wherein the condition is a deceleration of the electric vehicle during a descent without using a friction brake separate from the electric machine.

13. The assembly of claim 10, wherein the condition is an increasing of thermal energy in a fluid of the electric vehicle.

14. The assembly of claim 10, wherein intentionally increasing the non-torque output reduces a ratio of the torque output to a total electrical input power by at least ten percent.

15. The assembly of claim 10, further comprising driving a vehicle wheel using the electric machine.

16. The assembly of claim 10, wherein the controller is an electric drive system controller that calculates the non-torque output based at least in part on device temperature.

17. The assembly of claim 11, further comprising a vehicle system controller that calculates whether the non-torque output desired.

18. The method of claim 1, wherein the electric machine producing the torque output and the non-torque output comprises no more than one electric machine.

19. The assembly of claim 10, wherein the electric machine producing the torque output and the non-torque output comprises no more than one electric machine.

20. A method, comprising:
    producing a torque output and a non-torque output using a single electric machine within an electric vehicle; and
    in response to a command from a powertrain controller, intentionally increasing the non-torque output from the electric machine while maintaining the torque output from the electric machine to intentionally increase thermal energy within the electric machine.

* * * * *